United States Patent [19]

Iwamoto et al.

[11] Patent Number: 4,912,669
[45] Date of Patent: Mar. 27, 1990

[54] DOCUMENT-EDITING SYSTEM

[75] Inventors: Tadahiro Iwamoto; Mituo Katou; Masakazu Yamamoto, all of Tokyo, Japan

[73] Assignee: Kabushiki Kaisha Toshiba, Kawasaki, Japan

[21] Appl. No.: 908,614

[22] Filed: Sep. 17, 1986

[30] Foreign Application Priority Data

Sep. 20, 1985 [JP] Japan .................................. 60-207905

[51] Int. Cl.⁴ .......................................... G06F 3/153
[52] U.S. Cl. ................................ 364/900; 364/927.4; 364/967.1; 364/943.44
[58] Field of Search ............................. 364/200, 900

[56] References Cited

U.S. PATENT DOCUMENTS

| | | | |
|---|---|---|---|
| 4,078,249 | 3/1978 | Lelke et al. | 364/200 |
| 4,435,778 | 3/1984 | Cason et al. | 364/900 |
| 4,538,225 | 8/1985 | Banks et al. | 364/200 |
| 4,608,662 | 8/1986 | Watanabe et al. | 364/900 |
| 4,633,430 | 12/1986 | Cooper | 364/900 |

Primary Examiner—Thomas M. Heckler
Attorney, Agent, or Firm—Finnegan, Henderson, Farabow, Garrett and Dunner

[57] ABSTRACT

A document editing system for storing a plurality of format data records in a tree structure which define the format of a document. The format data records comprise any combination of a title field, a basic field, and a group field. A document data management section, in response to a document preparation request from a work station, prepares a basic document having a tree structure consistent with the document format data records. Furthermore, the document data management section updates the basic document with externally input data to prepare a target document. The document data management section determines the number of lines and characters per line of a group field including a line/character increase or decrease field, from a tree structure subordinate to the group field.

16 Claims, 20 Drawing Sheets

FIG. 1
(PRIOR ART)

| PROGRAM SPECIFICATION | PROGRAM NAME | | CODER | DATE | |
|---|---|---|---|---|---|
| FUNCTION | | | | | |
| HOW TO USE | | | | | |
| INPUT | | | SUBROUTINE | | |
| | | | NAME | SUMMARY | |
| OUTPUT | | | | | |

FIG. 2
(PRIOR ART)

| PROGRAM SPECIFICATION △ NAME | △XXXX△△△ CODER | XX△△ DATE | 7/16 ⊚ |
|---|---|---|---|
| FUNCTION | | | |
| △XXXXXX - - - - - - - - - - - - - - - - - - - - - - - - - - - - - - - - - - - - - - XXX ⊚ | | | |
| △XXXXXX - - - - - - - - - XXX ⊚ | | | |
| HOW TO USE ⊚ | | | |
| △XXXXXX - - - - - - - - - - - - - - - - - - - - XXXX ⊚ | | | |
| INPUT △△△ - - - - - - - - - - △△△ | SUBROUTINE TO BE USED ⊚ | | |
| △XXXXXXX△△△ - - - - - | △△ NAME △△ - - - - - △△ SUMMARY ⊚ | | |
| △△△ - - - - - - - - - - △△△XXXX△△△△△ | △△△△XXXXX△△△△△ XXXX ⊚ | | |
| OUTPUT △△△ - - - - - - - △△△ | △△△△XXXXX△△△△△△△△△XXXXX | | |
| △XXXXXX△△ - - - - - | - - △△△△XXXX ⊚ | | |
| △△△ - - - - - - - - - | △△△△XXXX△△△△△△△△XXXXX ⊚ | | |

XXX - - - : INPUT DATA BY USER
△△△ - - - : SPACE BY USER
⊚ : CARRIAGE RETURN AND LINE FEED

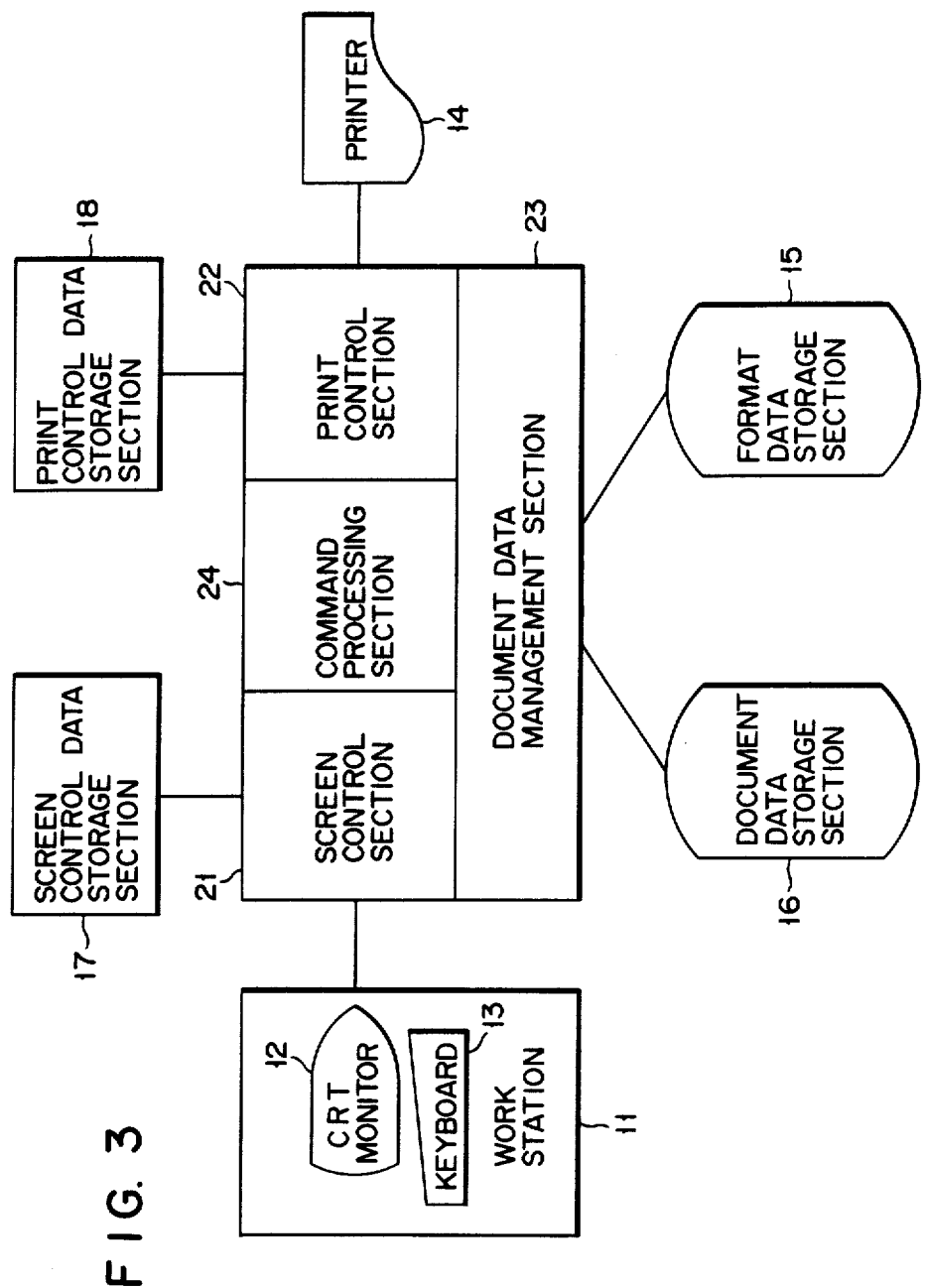
F I G. 3

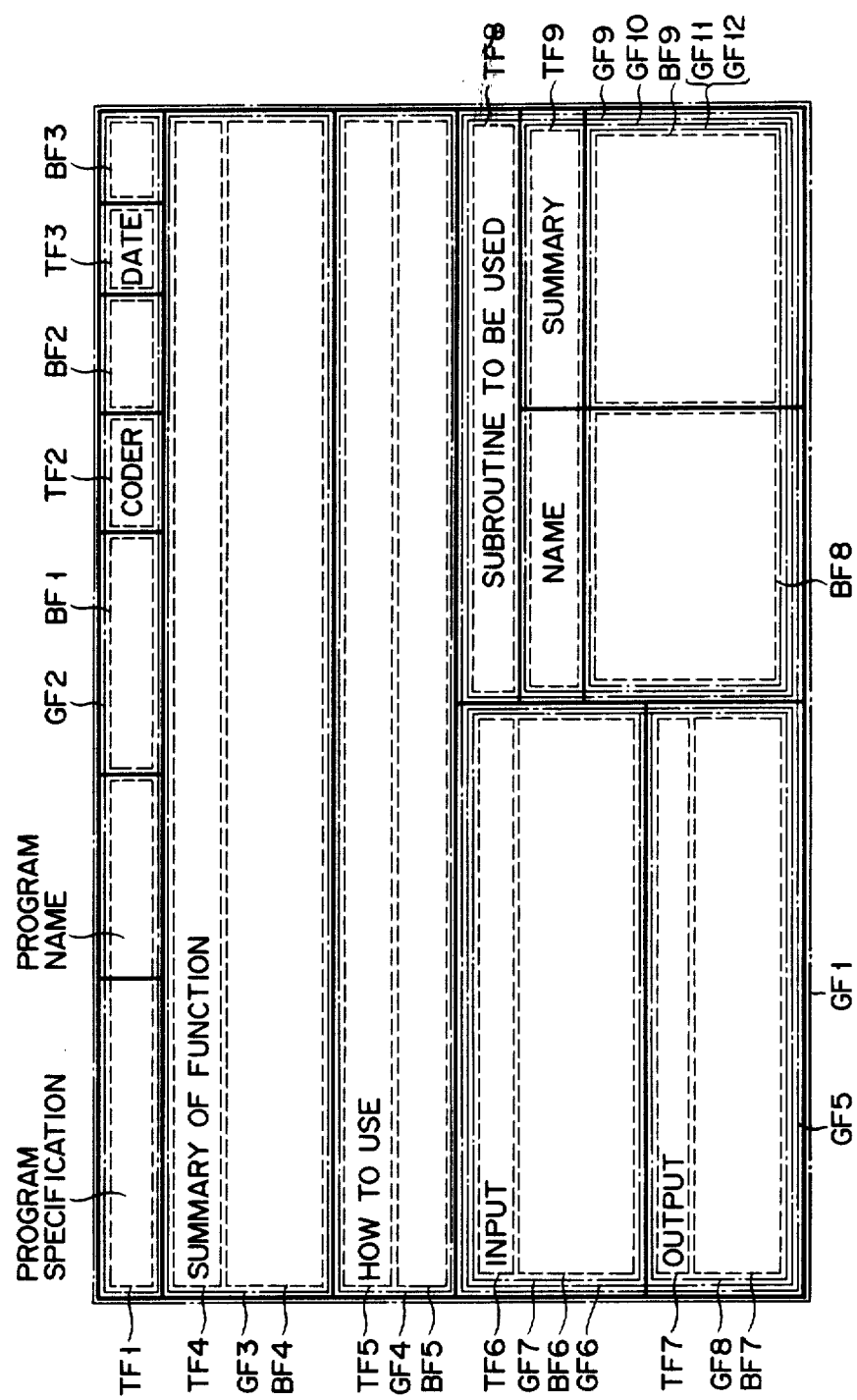

FIG. 6A

| 31 | 32 | 33 | 34 | 35 | 36 |
|---|---|---|---|---|---|
| FIELD TYPE | ITEM ID | NUMBER OF LINES | NUMBER OF DIGITS | FLAG | SCREEN CONTROL RECORD NUMBER |

FIG. 6B

| 31 | 32 | 33 | 34 | 35 | 36 | 37 |
|---|---|---|---|---|---|---|
| FIELD TYPE | ITEM ID | NUMBER OF LINES | NUMBER OF DIGITS | FLAG | SCREEN CONTROL RECORD NUMBER | DATA POINTER |

FIG. 7A

| 41 | 42 | 43 | 44 | 45 | 46 | 47 |
|---|---|---|---|---|---|---|
| ITEM TYPE CODE | ITEM ID | LEVEL | NUMBER OF LINES | NUMBER OF DIGITS | FLAG | CHART DESIG-NATION |

FIG. 7B

| 41 | 42 | 43 | 44 | 45 | 46 | 47 | 48 |
|---|---|---|---|---|---|---|---|
| ITEM TYPE CODE | ITEM ID | LEVEL | NUMBER OF LINES | NUMBER OF DIGITS | FLAG | CHART DESIG-NATION | TITLE DATA |

FIG. 7C

| 41 | 42 | 49 |
|---|---|---|
| ITEM TYPE CODE | ITEM ID | INITIAL DATA |

FIG. 8

| 51 | 52 | 53 | 54 | 55 | 56 | 57 | 58 |
|---|---|---|---|---|---|---|---|
| FIELD TYPE | ITEM ID | LEVEL | NUMBER OF LINES | NUMBER OF DIGITS | FLAG | START POSITION | FIELD POINTER |

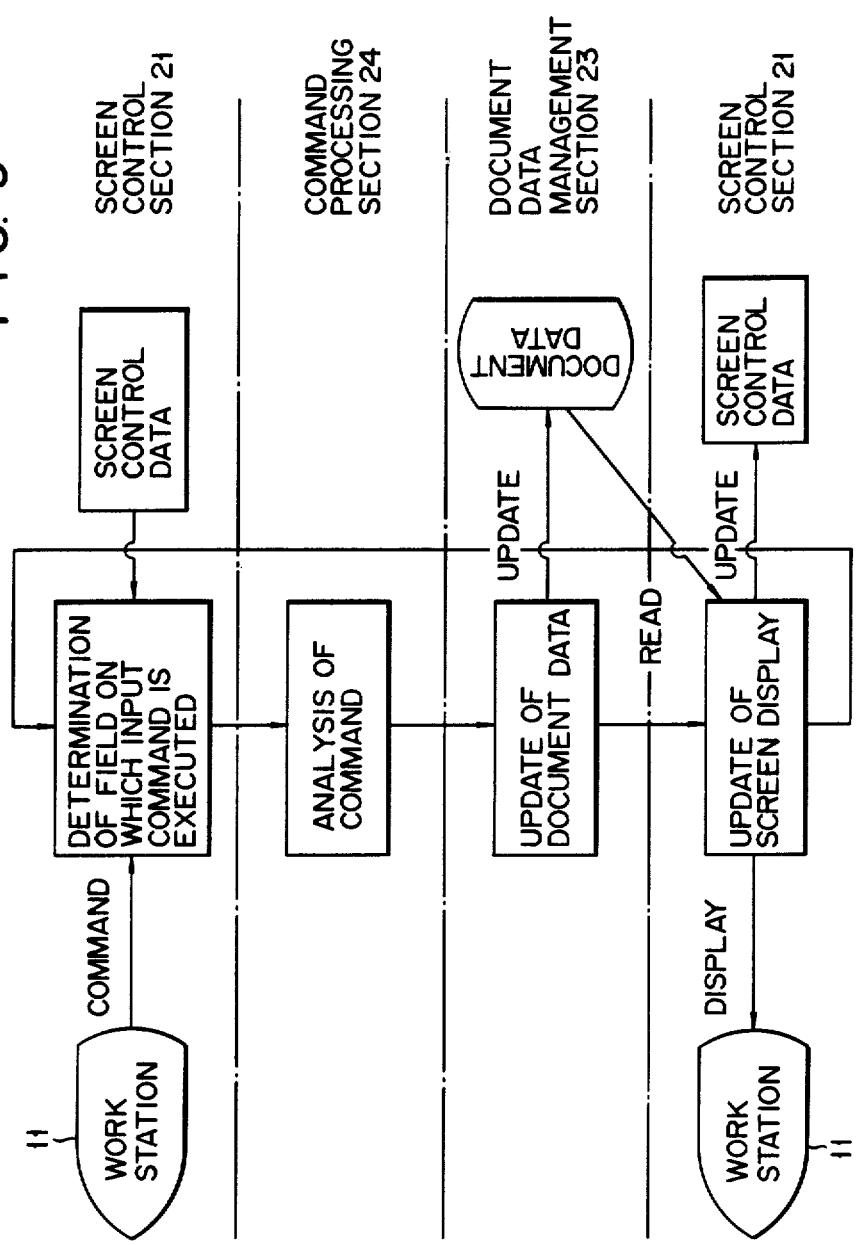

FIG. 10A
GROUP FIELD GF
├── FIELD F1
├── FIELD F2
└── FIELD F3
FIG. 10B
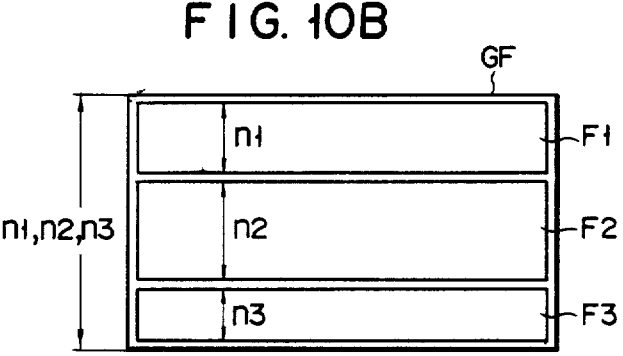
FIG. 10C
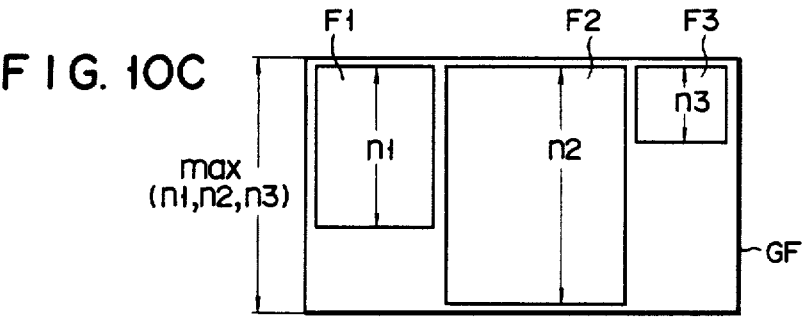
FIG. 12
| PROGRAM SPECIFICATION | PROGRAM NAME | | CODER | DATE | |
|---|---|---|---|---|---|
| FUNCTION | | P | | | |
| HOW TO USE | | | | | |
| INPUT | | | SUBROUTINE | | |
| | | | NAME | SUMMARY | |
| OUTPUT | | | | | |

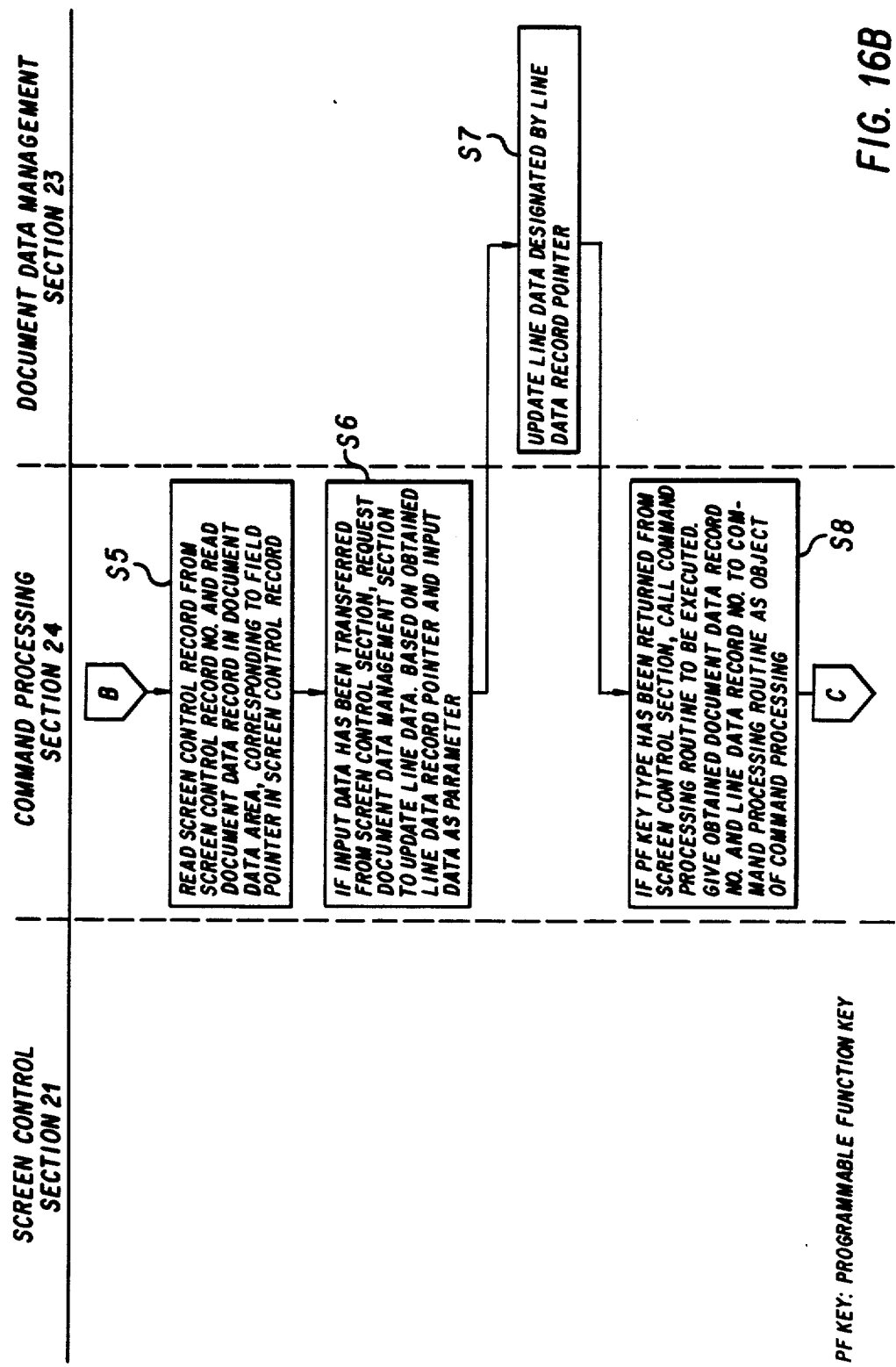

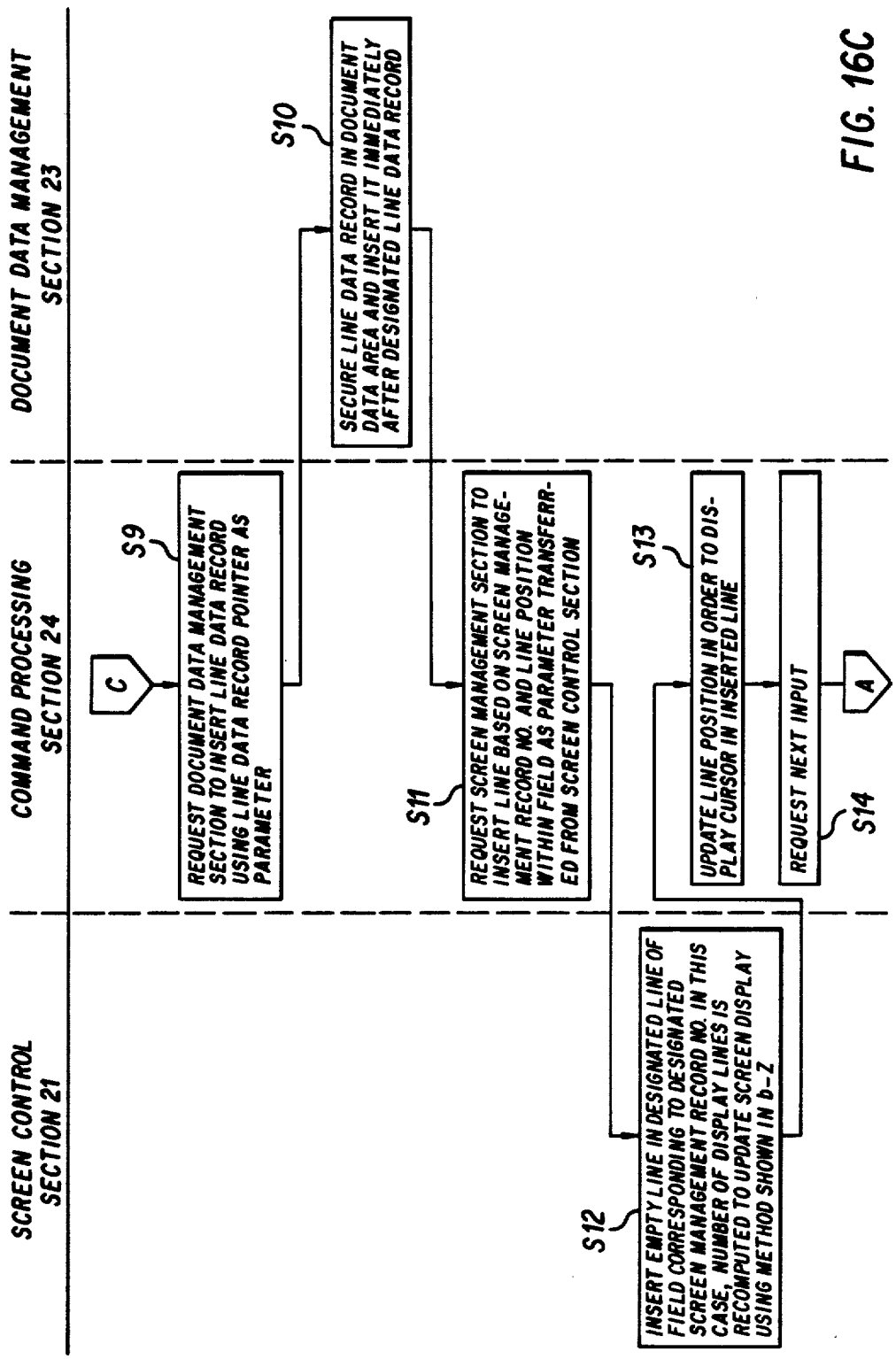

DOCUMENT-EDITING SYSTEM

BACKGROUND OF THE INVENTION

The present invention relates to a document-editing system for preparing and editing documents of a specific format.

Most business documents and technical documents are written or printed on format sheets. Using the format sheets, the people preparing the documents are less likely to forget to include all the necessary items of data. Computer program specifications are usually written on the format sheets shown in FIG. 1.

When the writer uses a word processor to write, edit, and print a specification on the format sheets of FIG. 1, however, he or she ma encounter the following problems:

(1) Characters and lines must b arranged on the display screen of the word processor, in such positions that they can be printed within the respective fields of the format. It takes the user a longer time to do this than to print the data on blank sheets.

(2) The data that can be written within each field is limited. To write more data, the writer must add the words "Continued on the attached sheet" in the field and print the overflowing part of the data on another format sheet. (This will cause the reader trouble, too, since he or she must then refer to the attached sheet while reading the format sheet.)

Document-editing systems, each designed to print data in a particular format, are known. Each system uses program-controlling codes containing document format data. To change the format, a new program must be prepared as often as is necessary.

SUMMARY OF THE INVENTION

Accordingly, the object of this invention is to provide a document-editing system which makes it possible to efficiently prepare, edit, and print documents in a specific format without subsequently destroying that format, no matter how much or how little data each document contains.

To achieve this object, the document-editing system of this invention comprises:

format-data storage means for storing one or more format data records of a tree structure consisting of nodes defining the format of a document, the respective nodes being comprised of any one of: a title field corresponding to the title of a format, a basic field corresponding to a leaf node of the tree structure and corresponding to a fill-in block, and a group field corresponding to an internal node and representing one or more fields being treated as a single field;

document-preparation request means for requesting the preparation of a document in the desired document format;

first document-preparation means for preparing initial document data of the tree structure of the format data, in accordance with the corresponding format data within said format data-storage means, in response to a request from said document-preparation request means; and second document-preparation means for calculating the number of lines of a group field and the number of characters per line from the tree structure subordinate to the nodes corresponding to the group field, said group field including a field which must be expanded or contracted in the vertical or the horizontal direction, or both, in order to renew the initial document data in accordance with externally input data, to form new desired document data.

With this system, it is possible to efficiently prepare and edit documents in a specific format, by way of a dialogue between the operator and a work station, and to print the documents in the desired format. The system has a memory for storing the data representing the format, and can therefore easily renew the format, whenever it is required. Hence, with this system it is possible to efficiently prepare, edit, and print documents in the desired format without subsequently destroying that format, no matter how much or how little data each document contains.

BRIEF DESCRIPTION OF THE DRAWINGS

Other objects and features of the present invention will be apparent from the following description taken in conjunction with the accompanying drawings, in which:

FIG. 1 shows a document format used in prior art;

FIG. 2 is a diagram explaining how to prepare documents in the format of FIG. 1;

FIG. 3 is a block diagram illustrating a document-editing system according to one embodiment of the invention;

FIGS. 4A, and 4B illustrate the structure of the document format data used in the system of FIG. 3;

FIGS. 6A and 6B represent the format of the document data record used in the system of FIG. 3;

FIGS. 7A through 7C show the format of the format data record used in the system of FIG. 3;

FIG. 8 shows the format of the control data record used to control the display screen of the system shown in FIG. 3;

FIG. 9 is a flow chart explaining the operation of the system shown in FIG. 3;

FIGS. 10A through, 10C are diagrams illustrating how to determine the number of lines to be printed within each field of the document format;

FIG. 12 is a diagram representing the relation between the document format and the regions of the display screen;

FIGS. 16A–16C show the functions performed by the system of the present invention while making a new document.

DETAILED DESCRIPTION OF THE PREFERRED EMBODIMENTS SYSTEM STRUCTURE

Figure 4B:
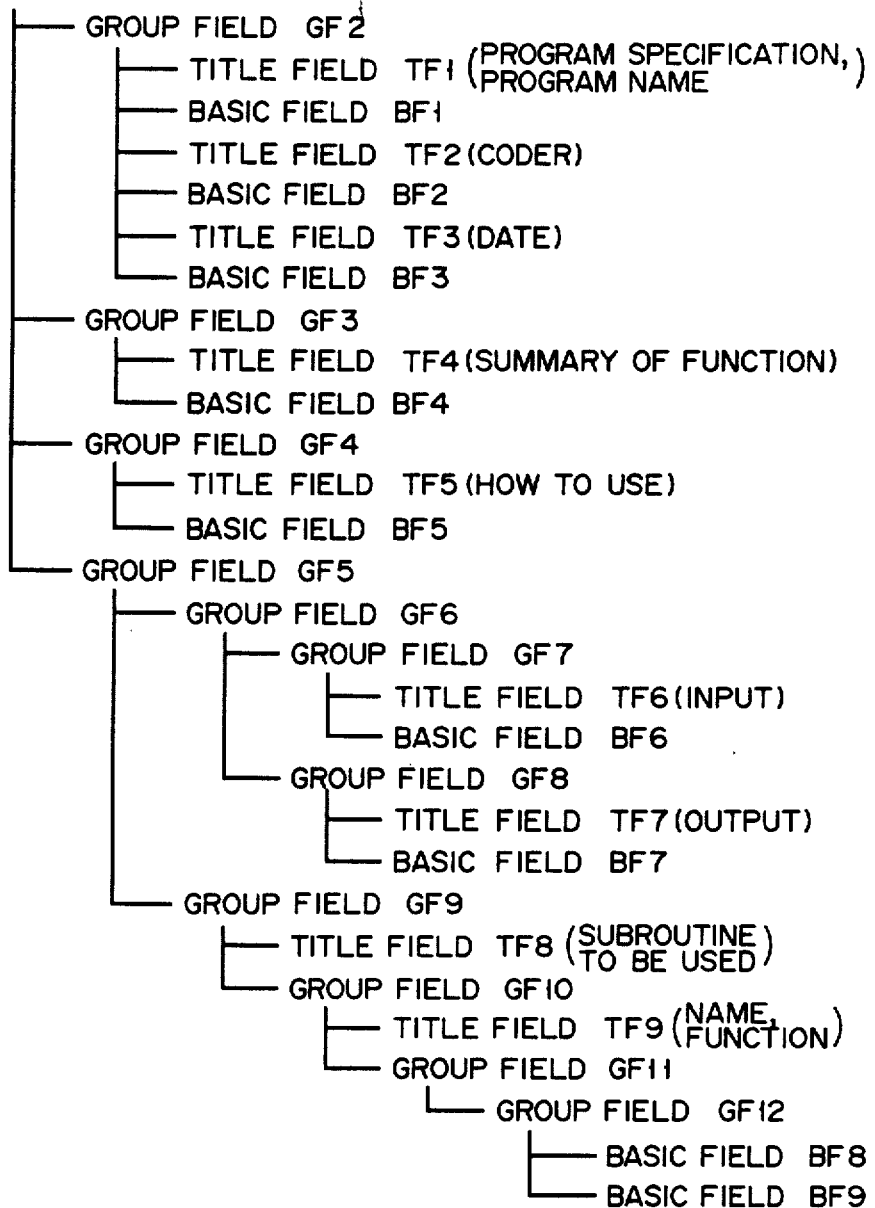

FIG. 3 shows the structure of a document-editing system according to one embodiment of the invention. This system comprises work station 11, printer 14, format-data storage section 15, document-data storage section 16, screen control-data storage section 17, print control-data storage section 18, screen control section 21, print control section 22, document-data management section 23 and command-processing section 24. Work station 1 has CRT monitor 12 and keyboard 13. Screen control section 21 receives the command input through keyboard 13. It also controls screen control-data storage section 17, thereby to control a CRT monitor for displaying a document. Print control section 22 controls print-control data storage section 18, thereby to control printer 14, in the printing of the document. Document management section 23 controls format-data storage section 15 and document-data storage section 16, thereby making it easier to prepare and edit documents. Command-processing section 24 analyzes the command input through keyboard 13 and supplied to screen control section 21. It also controls control sections 21, 22, and 23, in order to process the analyzed command. Format-data storage section 15 stores the items of data representing various document formats. Document-data storage section 16 stores document data. Screen control-data storage section 17 stores screen control data for controlling CRT monitor 12 to display documents. Print control-data storage section 18 stores print control data for controlling printer 14.

Structure of the Document Data

The system is designed to edit documents of a so-called "tree structure." The nodes of this structure will be called "fields." The fields are classified into the following three groups:

(1) Title Fields

These correspond to the leaf nodes of the tree structure. They are displayed by CRT monitor 12 and printed by printer 14, as part of document format, along with a document.

(2) Basic Fields

These also correspond to the leaf nodes of the tree structure, and to the fill-in blocks of the document format in which data can be printed. All document data that can be input is written in these fields.

(3) Group Fields

Group fields correspond to the internal nodes of the tree structure. Each group field consists of at least two fields of any other type, e.g., title fields, basic fields, and fields which correspond to internal nodes subordinate to the internal node corresponding to the group field.

The document shown in FIG. 1 can be defined as a combination of title fields TF1-TF9, basic fields BF1 to BF9, and group fields GF1-GF12, as is illustrated in FIG. 4A. Any field is a rectangular block. The fields subordinate to any group field occupy part of the rectangular block corresponding to the group field. The tree structure of the document data shown in FIG. 4A is illustrated in FIG. 4B. Group field GF12 is a copy in this case. Hence, higher group field GF11 can contain at least two group fields GF12.

Figures 5A, 5B:
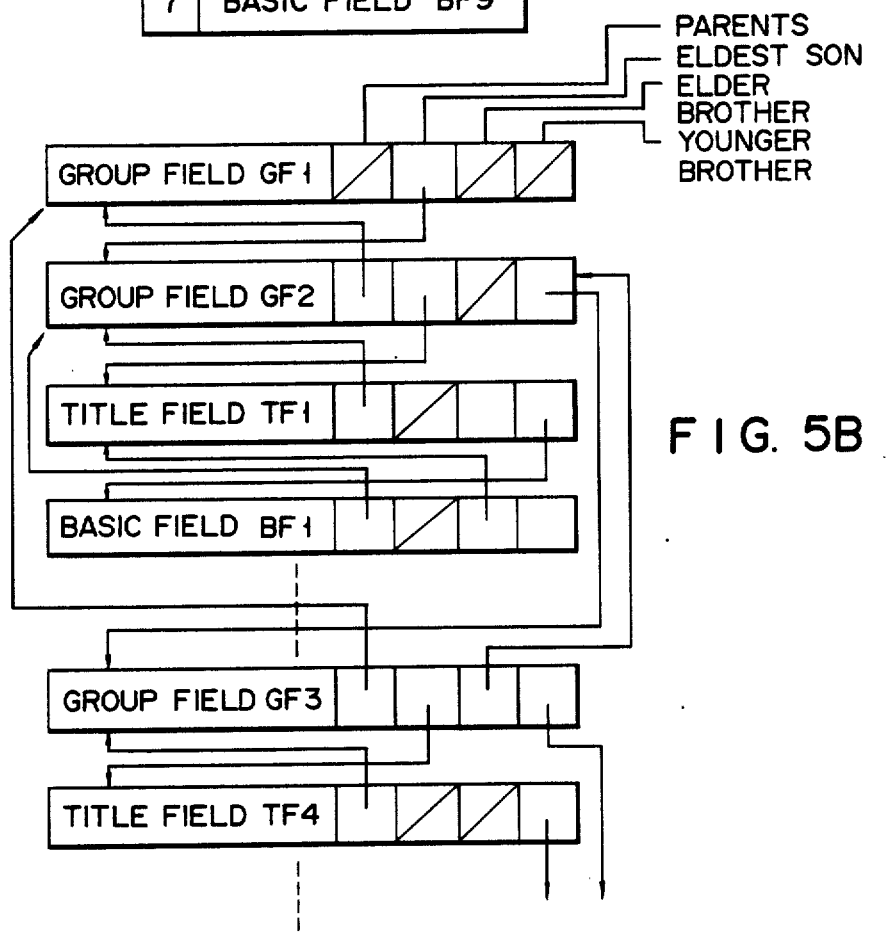
FIGS. 5A and 5B show the internal structure of the document format data.

FIGS. 5A and 5B shows the internal structure of the document data having the tree structure shown in FIG. 4B. More specifically, FIG. 5A illustrates the internal structure defined by blocks, and FIG. 5B shows the internal structure defined by logic pointers. The internal structure of FIG. 5A comprises document data records corresponding to the fields of the document (FIG. 4B), and different tree structure levels are assigned to the records. Level 1 corresponds to the root of the tree (FIG. 4B). On the other hand, in the internal structure of FIG. 5B, logic pointers indicative of the relatives, parent, eldest son, elder brother, and youngest brother are assigned to document data records corresponding to the fields of the document (FIG. 4B).

FIG. 6A shows the format of each document data record of the internal structure of FIG. 5A. FIG. 6B shows the format of each document data record of the internal structure shown in FIG. 5B.

As is shown in FIG. 6A, any document data record of the internal structure (FIG. 5A) has six items, reference numbers 31 to 36. Item 31 is used to set the type of field corresponding to the document data record. Item 32 is used to set an ID code specifying a data format record (described later) corresponding to the document data record. Item 33 is used to set the number of lines to be displayed or printed in the field. Item 34 is used to set the number of digits per line. Item 35 is used to set a flag representing the nature of the field. Item 36 is used to set the number of the screen control record included in the screen control data produced by screen control section 21 and corresponding to the document data record. The following four flags can be selectively set in item 35:

(a) Copy Flag

This flag indicates that the field can be copied in the document data. When the field is a group field, the fields, including the fields which correspond to internal nodes subordinate to the internal node corresponding to the group field, can be copied.

(b) Position F.

This flag is used only when the field is a group field. It designates the expansion/contraction of the field in the horizontal and/or vertical direction.

(c) Division Flag

This flag is used when data overflows the field. It indicates whether the entire data or only the overflowing portion of the data should be printed on the next page.

(d) Title-Printing Flag

This flag indicates whether or not a title should be printed in the corresponding title field. The flag is used in order to print titles on a format sheet.

Flags (a)–(d) are also contained in the format data record. Therefore, item 35 is not strictly necessary.

Items 31 to 36 are provided in any document data record, no matter what kind of field corresponds to this document data record. In the case of a data record format using logic pointers, item 37 is provided in the document data record corresponding to a basic field, in addition to items 31 to 36, as illustrated in FIG. 6B. Item 37 is used to set a pointer in the basic field. The data to be written in the basic field is composed of sentences in Japanese. Hence, the pointer set in item 37 specifies a line data structure. If image data or graphic data is written in the basic field, the pointer or file name specifying the structure of this data is set in item 37.

Structure of the Format Data

The format data defining the format of the document has a tree structure similar to that of the document data. The format data also comprises a plurality of records, each being of one of the three types shown in FIGS. 7A, 7B, and 7C. The format data record of FIG. 7A has seven items, reference numbers 41 to 47; the format data record of FIG. 7B has eight items, reference numbers 41 to 48; and he format data record of FIG. 7C has three items, reference numbers 41, 42, and 49.

Item 41 is used to set a code showing the type of the field corresponding to the format data record, a title, basic or group, or whether or not the format data record is the initial data set to the field corresponding to the record. Item 42 is used to set an ID code specifying that field of the document data which corresponds to the format data record. Item 43 is used to set the level of the field corresponding to the format data record. Item 44 is used to set the number of lines to be displayed and printed in the corresponding field. Item 45 is used to set the number of digits per line. Item 46 is used to set a flag representing the nature of the field. The flag set in item 46 has the same function as the flag set in item 35 of the document data record. Item 47 is used to draw field-framing lines, such as underlines, overlines, and vertical lines, in order to specify a relative value of a start position of the field, to draw the field-framing lines. More precisely, item 47 designates the position of each of these field-framing lines, with respect to the display-starting position of the field. Item 48 is used only when the code set in item 41 designates the title field. Item 48 designates a character string to be displayed or printed as the title. Item 49 is used only when the code set in item 41 shows the data which is to be input as the initial data in the field. In this instance, item 49 designates a character string, since the data to be written in the field are sentences.

Structure of Screen Control Data

The screen control data has the same tree structure as the document data. Each of the records forming the screen control data corresponds to one record of the document data. The screen control data record has the format shown in FIG. 8. It has eight items, reference numbers 51 to 58. Item 51 designates the type of the field. Item 52 designates the ID code. Item 53 designates the level of the field corresponding to the control data record. Item 54 designates the number of lines to be displayed and printed in the corresponding field. Item 55 designates the number of digits per line. Item 56 designates a flag representing the nature of the field. Item 57 designates the display-starting position of the field; to be more specific, the upper-left corner of the field. Item 58 designates the field pointer specifying that field of a document file (not shown) which corresponds to the screen control data record.

Operation of the System (Brief Explanation)

The operation of the system shown in FIG. 3 will now be briefly explained with reference to the flow chart of FIG. 9.

The operator inputs a command through keyboard 13 of work station 11. Upon receipt of this command, screen control section 21 retrieves the screen control data from screen control-data storage section 17, in accordance with the position which the cursor assumes on the screen of CRT monitor 12 when the command is input. Then, section 21 identifies the field in which the command will be executed, and also the data to be written in this field. Section 21 then supplies the command to command-processing section 24. Section 24 analyzes the command, and, in accordance with the purpose of the command, gives document-data management section 23 an instruction for renewing the document data stored in storage section 16. Document-data management section 23 renews the document data, if necessary, with reference to the format data stored in storage section 15. Then, command-processing section 24 gives screen control section 21 a renewal instruction, to make the document image displayed on CRT monitor 12 identical to the document data renewed by the execution of the command. Screen control section 21 executes this instruction, with reference to the document data stored in document-data storage section 16, the format data stored in storage section 15, and the screen control data stored in storage section 17, thereby renewing the document image displayed on CRT monitor 12. At the same time, section 21 renews the screen control data, thereby rendering it applicable to the renewed document image. Thereafter, command-processing section 24 gives screen control section 21 a command-input instruction. In response to this instruction, screen control section 21 causes CRT monitor 12 to display the cursor, thereby requesting the operator to input another command.

The respective operations of the screen control section 21, the command processing section 24, and the document data management section 23 will now be described in detail.

Figure 16A:
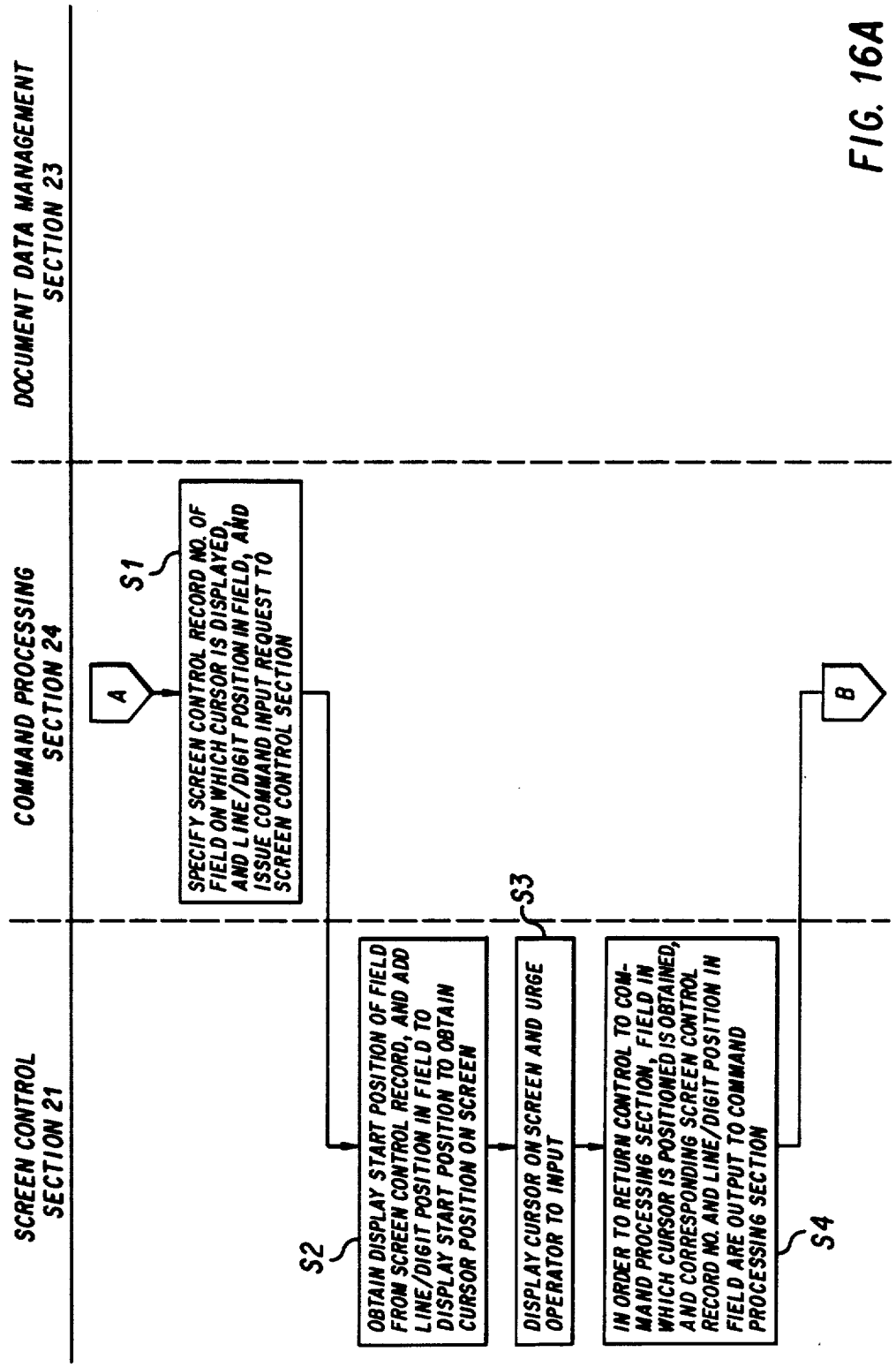

As shown in FIG. 16A, the command processing section 24 specifies, in step S1, a screen control record number of a field on which a cursor is displayed, and a line-digit position in a field, and issues a command input request to the screen control section 21.

In response to the command input request, the screen control section 21 obtains, in step S2, a display start position of a field from a screen control record, and adds a line/digit position in a field to the display start position to obtain a cursor position on a screen. In step S3, the screen control section 21 displays the cursor on a screen and prompts an operator for input. Further, in step S4, in order to return the control to a command processing section 24, the section 21 obtains the field in which the cursor is positioned, and outputs to the command processing section 24 the corresponding screen control record number and the line/digit position in a field.

As shown in FIG. 16B, in response to the output from the screen control section 21, the command processing section 24 reads, in step S5, the screen control record from the screen control record number and reads a document data record in the document data area corresponding to the field pointer in the screen control record. Further, section 24 requests, in step S6, the document data management section 23 to update the line data based on the obtained line data record pointer and the input data as the parameter, if the input data has been transferred from the screen control section 21.

In response to the request from the command processing section 24, the document data management section 23 updates, in step S7, the line data designated by the line data record pointer.

If a programmable function key (PF) key type has been returned from the screen control section 21, the command processing section 24 calls a command processing routine to be executed. In this case, the section 24 gives, in step S8, the command processing routine the obtained document data record number and the line data record number as an object of the command processing.

Then, in step S9, the section 24 requests the document data management section to insert a line data record using a line data record pointer as a parameter.

As shown in FIG. 16C, in response to the request from the command processing section 24, the document data management section 23 secures, in step S10, the line data record in the document data area and inserts it immediately after the designated line data record.

Then, the command processing section 24 requests, in a step S11, the screen management section 21 to insert a line based on the screen management record number and the line position within a field as the parameter transferred from the screen control section 21.

In response to the request from the command processing section 24, the screen control section 21 inserts, in step S12, an empty line in the designated line of a field corresponding to the designated screen management record number. In this case, the number of display lines is recomputed to update the screen display using the method shown in b-2.

Then, the command processing section 24 updates, in step S13, the line position in order to display the cursor in the inserted line, and in step S14, requests a next input.

Making of a New Document

Figure 15A:
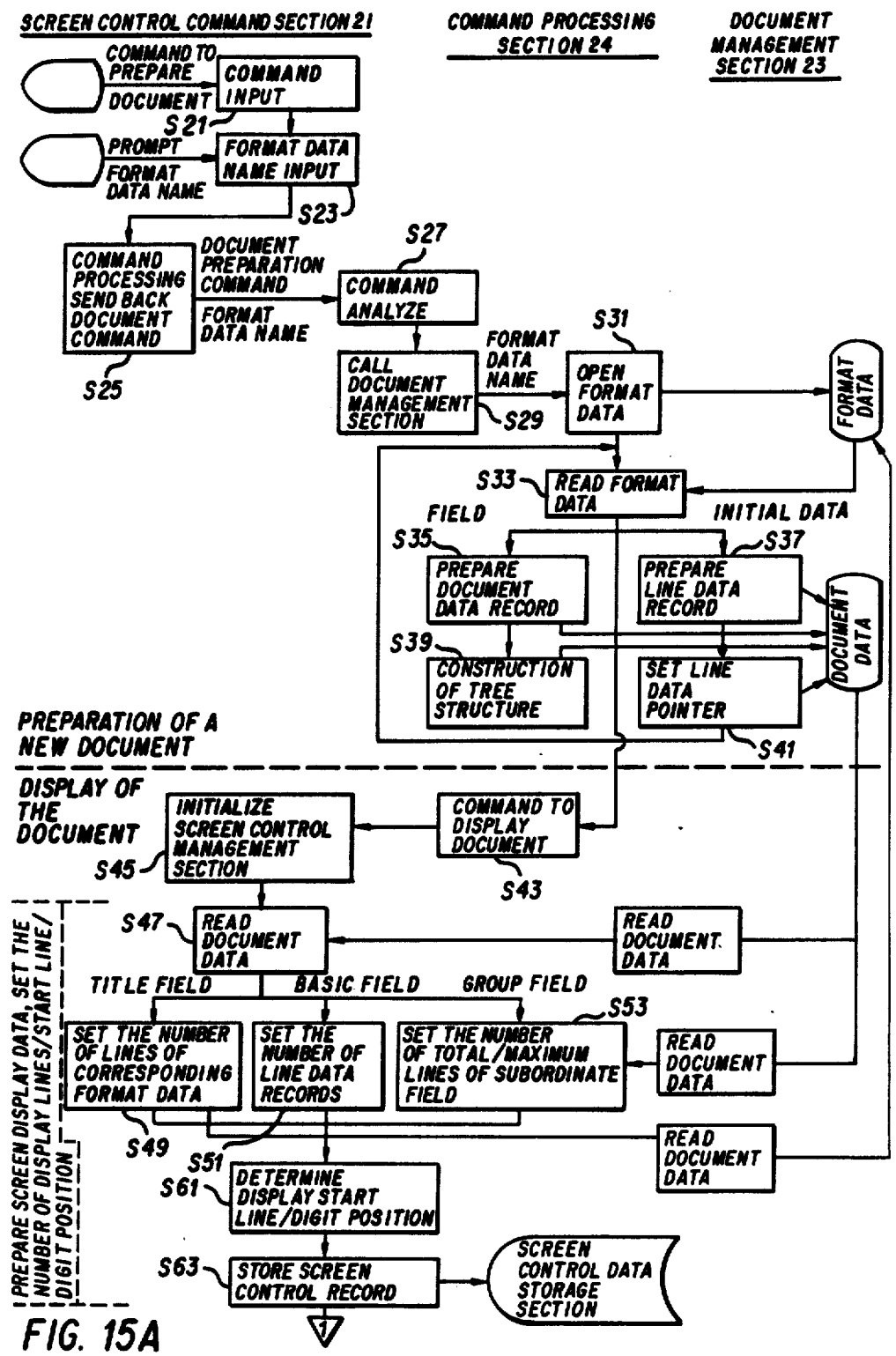
FIGS. 15A and 15B are flowcharts showing the functions performed by a system for editing document data incorporating the teachings of the invention to prepare a new document and to display the document.

The functions performed in making a new document are shown by the upper portion of the flowchart of FIG. 15A. To make a new document, the operator inputs a document-making command and the desired format data name, using work station 11. Screen control section 21 inputs the command and format data name to command-processing section 24. Section 24 gives document-data management section 23 a document-making instruction and the format data name. At this point in time, document-data storage section 16 is empty.

Document-data management section 23 opens the data file stored in format-data storage section 15 and identified by the format data name. It further sequentially reads the three format data records of the tree structures (FIGS. 7A, 7B, and 7C) from storage section 15, and constructs the same tree structure within document-data storage section 16. More precisely, when the code set in unit 41 of the format data record represents a title field, a basic field, or a group field, document-data management section 23 produces the document data records of the tree structures (FIGS. 6A and 6B) within document-data storage section 16. Section 23 also transfers the items of data set in items 41, 42, 44, 45, 46 of the format data record to, respectively, items 31, 32, 33, 34, 35 of the corresponding document data record. Simultaneously, section 23 constructs the tree structure specified by the level set in item 43 of the format data record; for example, the internal structure of the document format data shown in FIG. 5A.

When the code set in item 41 of the format data record is the initial data, section 23 transfers this initial data to a document region (i.e., a document file) within document-data storage section 16, and sets the pointer, which designates this document region, in item 37 (FIG. 6B) of the basic field, which immediately precedes item 41.

Document-data management section 23 repeats the operation of making a document data record, forming a document data record within storage section 16. Because of the format data records stored in section 15, section 23 therefore can produce documents in many different formats.

Display of the Document

Figure 15B:
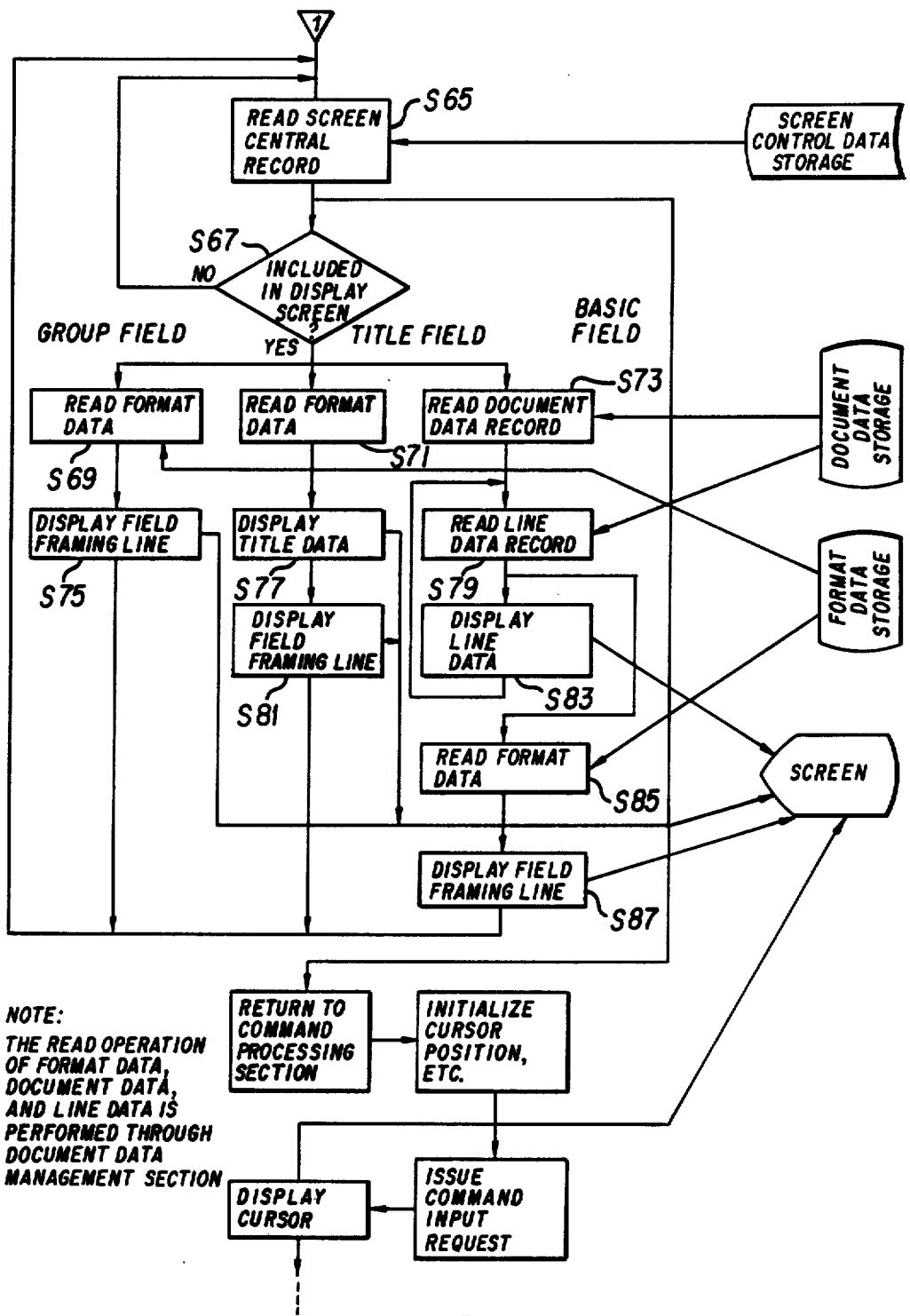

The functions performed to display a document are shown by the flowcharts of FIGS. 15A and 15B. The document corresponding to the document data formed within document data storage section 16 is displayed in the following sequence of steps: First, command-processing section 24 gives screen control section 21 a document-display instruction. Section 21 retrieves the document data and, if necessary, the format data from sections 16 and 15, via document-data management section 23, and forms screen control data having the same tree structure as the document data, within screen control-data storage section 17. The data items, which are set in items 51 to 58 of the screen control data record (FIG. 8) during the making of the screen control data, are as described below:

(1) In Items 51, 52, 53, 55 and 56

The data items copied from the document data record corresponding to the screen control-data record are set in these items.

(2) In Item 54

The number of lines to be displayed or printed in the field corresponding to the screen control data record is set in this item. The number of lines is determined by the type of the corresponding field, as is described below.

(i) When the field is a title field

The number of lines, which is identical with the number set in item 33 of the corresponding format data record.

(ii) When the field is a basic field

The number of lines, which is determined by the amount of data represented by the code set in item 37 of the corresponding document data record. When the code set in item 37 designates a line of characters, the number of lines is obtained by dividing the number of characters by the number of lines indicated by item 55 of the corresponding screen control data record. (When the code designates image data or graphic data, the data showing the structure of the data field, or the number of lines sufficient to display the image or graphic data can be stored in the document file.)

(iii) When the field is a group field

The number (n) of lines determined by the number of lines of any subordinate field. For example, when the group field (GF) has three subordinate fields F1, F2, and F3, as shown in FIG. 10A, number n is determined by number n1 of lines of field F1, number n2 of lines of field F2, and number n3 of lines of field F3. (If any subordinate field, F1, F2, or F3, has its own subordinate fields, the number of its lines is determined b the number of lines of any subordinate field. Hence, the number of lines is determined first by the number of lines of the lowest field.) When the position flag set in item 56 (FIG. 8) designates the expansion of the field in the vertical direction, n = n1 + n2 + n3, as shown in FIG. 10B. When the position flag designates the expansion of the field in the horizontal direction, the number n is the greatest number of lines, in this instance n = n2, as shown in FIG. 10C.

(3) In Item 57

Figure 11A:
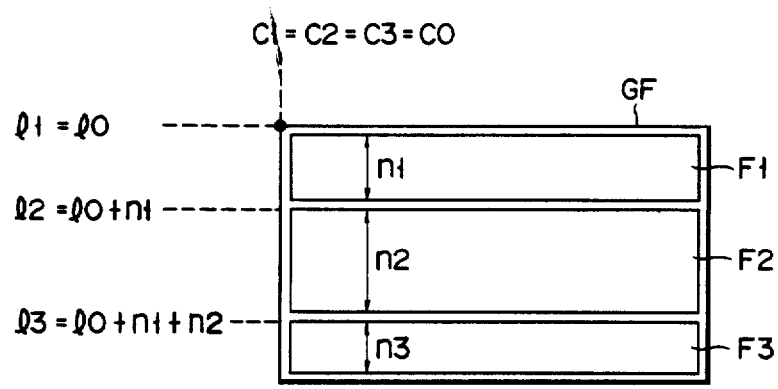
FIGS. 11A and 11B are diagrams explaining how to determine the position where the data-display operation is started.
Figure 11B:
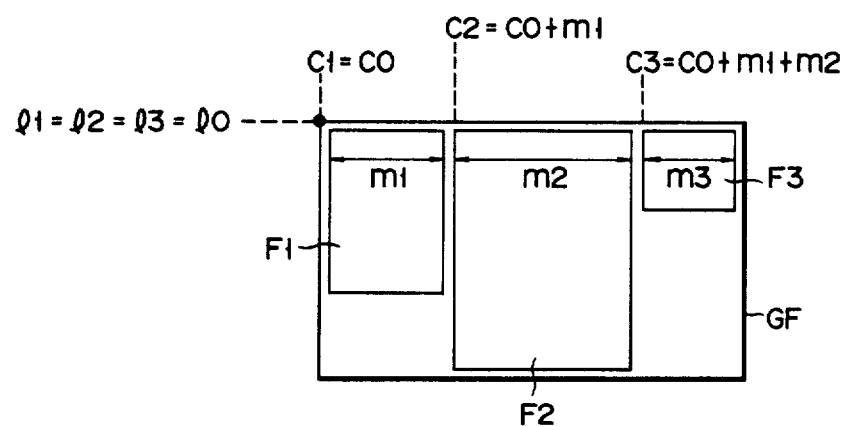

The data representing the display-starting position is set in this item. The display-starting position of any field is defined by the position of a line and the position of a digit. The display-starting position of the highest-order field, for example, group field GF1 of the document format data shown in FIG. 4B, is defined by coordinates (1, 1). Any other field, for example, group field GF shown in FIG. 10A, is defined by coordinates (0, c0). Let m1, m2, and m3 designate the number of digits forming one line of subordinate field F1, that of subordinate field F2, and that of subordinate field F3, respectively. When the position flag set in item 56 of the screen control data record corresponding to group field GF (FIG. 10A) designates expansion of the field in the vertical direction, the display-starting positions 1, 2, and 3 of fields F1, F2, and F3 will be (0, 0), (0, 0+n1), (0, 0+n1+n2), respectively, since the first digits c1, c2, and c3 of the respective subordinate fields F1, F2, and F3 are 0, 0+n1, and 0+n1+n2, as shown in FIG. 11C. On the other hand, when the position flag set in item 56 of this screen control-data record designates expansion of the field in the horizontal direction, the display-starting positions 1, 2, and 3 of fields F1, F2, and F3 will be (0, 0), (0, c0+m1), and (0, c0+m1+m2), respectively, since the first digits c1, c2, and c3 of the subordinate fields are, respectively, c0, c0+m1, and c0+m1+m2.

(4) In Item 58

The field pointer representing the document data record corresponding to the screen control data record is set in this item.

When all the screen control data, which consists of screen control-data records each having items 51–58, is completely formed, screen control section 21 uses this control data, to display the document data and the field-framing lines, vertical and horizontal, on the screen of CRT monitor 12 of work station 11. First, section 21 determines whether or not at least part of each rectangular field represented by the screen-control data can be displayed within display region P (FIG. 12) of the screen, from the display-starting position, the number of lines, and the position of the first digit of the field. If YES, section 21 performs the operation described below, in accordance with the type of the field set in item 51 of the screen control-data record.

When the field is a title field, section 21 read the corresponding format data record from format-data storage section 15, using item ID set in item 52 of the format-data record as the key code, and displays the title data set in item 48 of the format-data record in the display region corresponding to the title field. When the field is a basic field, section 21 reads the corresponding document-data record from document-data storage section 16, using the field pointer set in item 58 of the document data record as the key code. It then reads the data from the document file stored in document-data storage section 16 and designated by the data set in item 37 of the document-data record, and displays this document data on the display region corresponding to the basic field. Further, section 21 identifies the vertical and horizontal lines framing the title or basic field, by means of the data set in item 47 of the format-data record, and displays these field-framing lines. Section 21 also identifies the lines framing a group field, and displays these lines. Needless to say, any rectangular field which cannot be displayed completely within display region P (FIG. 12) of the screen will not be displayed on the screen of CRT monitor 12.

Display region P functions as a window. When the complete document cannot be displayed within region P, as shown in FIG. 12, the operator operates keyboard 13 of work station 11, thereby moving the window up and down, and left to right and vice-versa, until the document being displayed comes fully within the window. Then, screen control section 21 begins performing the above-described operations on the fields displayed within the window, either partially or completely.

Operations of the screen control section 21, the command processing section 24, and the document data management section 23 in order to prepare a new document will be described in more detail.

As shown in FIG. 15A, the screen control section 21 enters, in step S21, a command and, in step S23, a format data name. Then, in step S25, the section 21 transfers the document preparation command and the format data name to the command processing section 24.

The command processing section 24 receives, in step S27, the document preparation command and the format data name, and analyzes the command. Then, the section 24 calls, in step S29, the document management section and sends the format data name thereto.

In response to the call from the section 24, the document data management section 23 opens, in step S31, the format data and, in step S33, reads the format data. If the format data represents the field data, the section 23 prepares, in step S35, the document data record and, in step S39, constructs the tree structure of the document data.

On the other hand, if the format data is the initial data, the section 23 prepares, in step S37, the line data record, and in step S41, sets the line data pointer.

Operations of the sections 21, 23, and 24 in order to display the document will be described.

The command processing section 24 gives, in step S43, a command to display the document to the screen control section 21.

In response to the command, the section 21 initializes, in step S45, the screen control management section. Then, in step S47, the section 21 reads the document data. When the field is the title field, the section 21 sets, in step S49, the number of lines of the corresponding format data. When the field is the basic field, the section 21 sets, in step S51, the number of line data records. When the field is the group field, the section 21, sets, in step S53, the number of total/maximum lines of a subordinate field. Then, in step S61, the section 21 determines the display start line/digit position, and in step S63, stores the screen control record.

As shown in FIG. 15B, in step S65, the section 21 reads the screen control record, and determines, in step S67, whether the screen control record is included in the display screen. If it is included, the section 21 reads the format data in step S69 when the field is the group field. Then, in step S75, the section 21 displays the field framing line. If the field is the title field, the section 21 reads the format data in step S71. Then, in step S77, the section 21 displays the title data and, in step S81, displays the field framing line. When the field is the basic field, the section 21 reads the document data record in step S73. Then, in step S79, the section reads the line data record and, in step S83 displays the line data. Furthermore, the section 21 reads the format data in step S85, and displays the field framing line in step S87.

Editing and Re-display of a Document

After having the initial document data displayed on CRT monitor 12, the operator inputs additional document data via keyboard 13 and/or deletes the initial document data, partially or completely, by means of keyboard 13. When the document data overflows any field, or is insufficient to completely fill the field, screen control section 21 automatically increases or decreases the number of lines set in item 33 of the screen control data record corresponding to this field. Then, section 21 calculates again the number of lines and display-starting position of any other field, as has been explained with reference to FIGS. 10A, 10B, and 10C and FIGS. 11A and 11B. Of these fields, only those whose number of lines and/or display-starting position has changed are displayed again on CRT monitor 12. As for the fields subordinate to any field whose number of lines or display-starting position has not changed, section 21 does not calculate the number of lines and display-starting position, nor does it display these subordinate fields. This saves on both calculation time and display time. Further, if the the document data being displayed on CRT monitor 12 is added to the screen control data and stored in screen control-data storage section 17, it can be quickly displayed again.

Figure 13A:
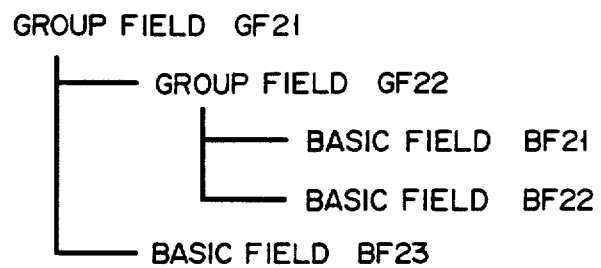
FIGS. 13A through 13D are diagrams showing how the field display mode changes as data is input.
Figure 13B:
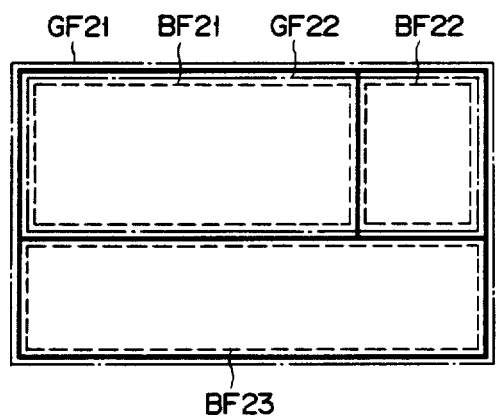
Figure 13C:
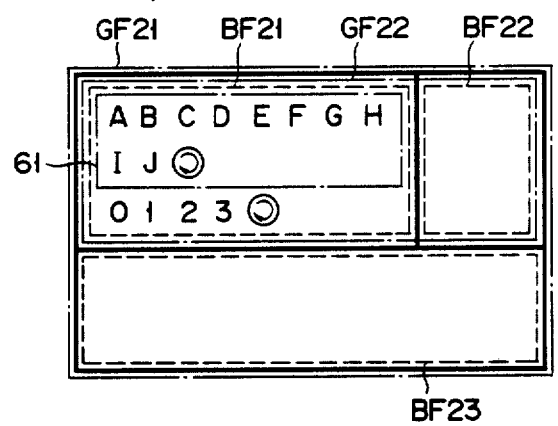
Figure 13D:
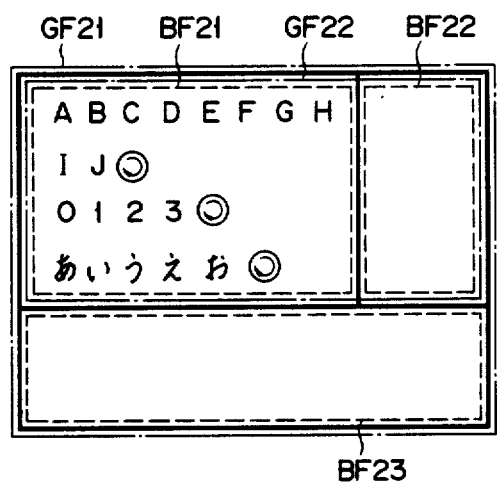

It will now be explained, with reference to FIGS. 13B, 13C, and 13D, how the document data of the structure shown in FIG. 13A and being displayed on CRT monitor 12 changes as new data is input via keyboard 13. As is shown in FIG. 13A, this document data is formed of field GF 21, and group field GF 22 and basic field BF23, both of which are subordinate to group field GF21, and two basic fields BF21 and BF22 both subordinate to group field GF22. The data of this structure is the initial document data displayed on CRT monitor 12, as is shown in FIG. 13B. FIG. 13C shows the state wherein the character data, input via keyboard 13, exceeds the original number of lines of basic field BF21. When this happens, the number of lines of field BF21 increases accordingly, to accommodate this overflow data. In this instance, the first line in basic field BF21, which consists of letters A to J, is too long, and the excess letters, I and J, are therefore displayed on the second line. When the operator inputs other data representing Japanese characters to be written in basic field BF21 and this data overflows field BF21, then field BF21 is automatically expanded in the vertical direction, as shown in FIG. 13D, whereby these Japanese characters are printed or displayed in basic field BF21, along with the previously input character data. Since basic field BF21 has expanded vertically, the number of lines of group field GF22 increase,, and basic field BF22 subordinate to group field GF22 also expands in the vertical direction.

Field Copying

If necessary, the operator can copy any field. In order to do so, he or she moves the cursor to the field displayed ON CRT monitor 12, and then inputs a copying request command via keyboard 13, to screen control section 21. Section 21 supplies this command and the field specified by the command to command-processing section 24. Upon receipt of the copying-request command and the screen control-data record, section 24 reads a copy flag, if set in item 35 of the document-data record corresponding to the field, from document-data storage section 16 via document-data management section 23. Section 24 determines whether or not the field can be copied, in accordance with whether or not a copy flag is set in item 35. If the field is group field GF12, shown in FIGS. 4A and 4B, the copy flag is set in item 35, and field GF12 can be copied. In this case, command-processing section 24 gives a field-copying instruction to document-data management section 23.

Upon receipt of the field-copying instruction, document-data management section 23 reads the format data record which corresponds to group field GF12, from format-data storage section 15, and forms a copy of this field (i.e., a copy f the document data record) within document-data storage section 16. At the same time, section 23 forms copies of the fields subordinate to group field GF12 (in this instance, basic fields BF8 and BF9), in the same manner as in preparing new documents, as has been described above Upon completion of the field-copying, section 23 returns the pointer specifying group field GF12 to command-processing section 24. Section 24 transfers this pointer to screen control section 21, thereby instructing section 21 to form a new field identical to field GF12.

More specifically, in accordance with the pointer transferred from command-processing section 24, screen control section 21 renews the screen control data stored in screen control-data storage section 17, using the document data read from document-data storage section 16 via document-data management section 23. This renewal of the screen control data can be accomplished in a way almost identical to that used in displaying the initial document data. Then, screen control section 21 calculates the number of lines and display-starting position of any other field, in the same manner as in adding and deleting field data, and causes CRT monitor 12 to display the entire document data including copied field GF12.

Figure 14A:
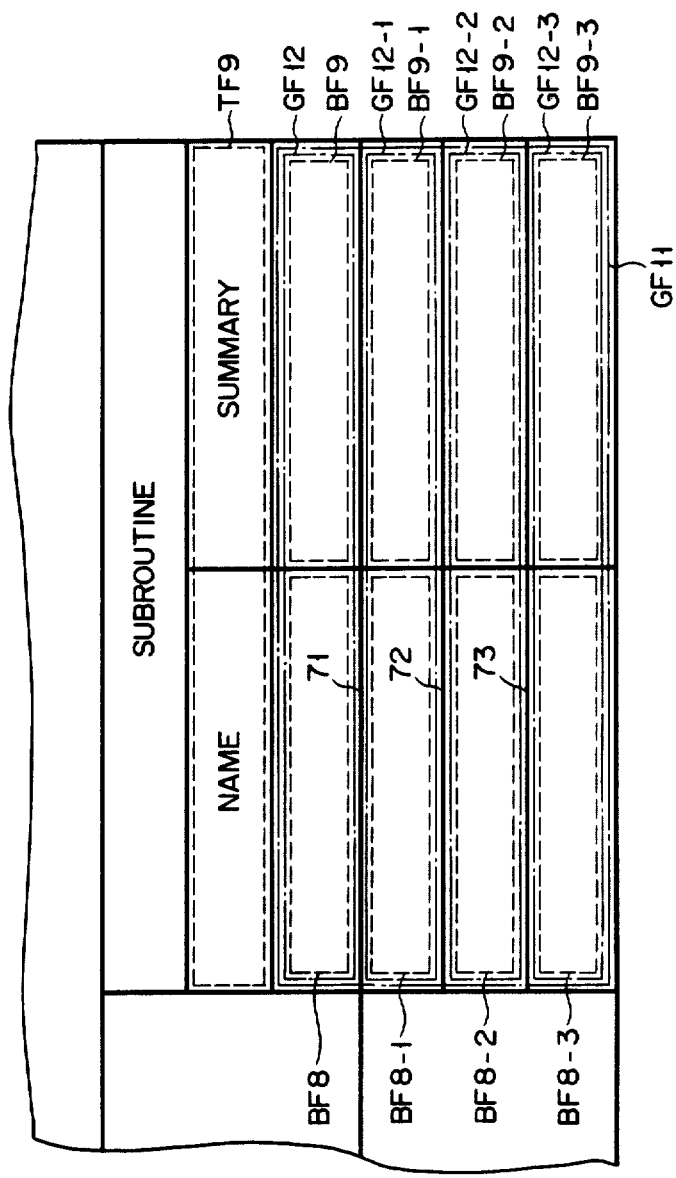
FIGS. 14A and 14B are diagrams explaining how to achieve field-copying.
Figure 14B:
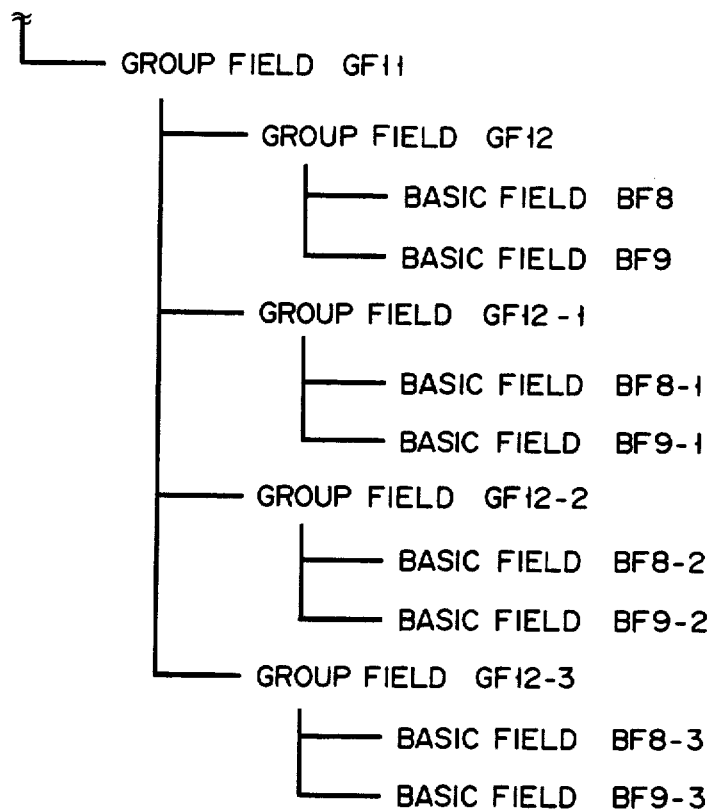

FIG. 14A shows the document corresponding to the document of FIG. 4A, and including copied fields. FIG. 14B illustrates part of the tree structure of this document. In FIG. 14A, GF12-1, GF12-2, and GF12-3 designate three copies of field GF12. As is shown in FIG. 14,, these copies of field GF12 have the same subordinate structure. Overlines 71, 72, and 73 extending above copied fields GF12-1, GF12-2, and GF12-3, are automatically displayed when group field GF12 is copied. This is because the data designating an overline is set in item 47 of the format data record corresponding to group field GF12. As is shown in FIG. 14A, the overline of group field GF1 overlaps with the underline of title field TF9.

Printing of the Document

Printer 14 prints the edited document under the control of print control section 22. Section 22 operates substantially in the same way as screen control section 21 does to display the initial document data on CRT monitor 12. The control data stored in print control-data storage section 18 and used to print the document has substantially the same tree structure and is formed in substantially the same manner as the screen control data.

Advantages of the Document-Editing System

The document-editing system described above is advantageous in the following respects:
 i. A document can be made and edited in a specified format easily and efficiently, via the dialog between the operator and work station 11.
 ii. The document made and edited can be printed neatly in the specified format.
 iii. Since the data representing the specified document format is stored in memory, the format can easily be changed or renewed.

iv. Since each field of the document format can be expanded and contracted in both the vertical and the horizontal direction, any amount of data can be printed within the field, without destroying the document format.

The above embodiment is used to prepare, edit, and print documents of a tree structure. Nonetheless, it can also prepare, edit, and print a document of the ordinary structures. If such is the case, document-data management section 23 converts the document data representing this document and the format data representing the format of the document to data items representing tree structure documents and tree structure format, and supplies these data items to screen control section 21, print control section 22, and command-processing section 24.

What is claimed is:

1. A system for editing document data having a plurality of fields, comprising:
    document-preparing format-data storage means for storing the plurality of fields of the document format-data into a tree structure having a plurality of levels, each of the plurality of levels corresponding to a node of said tree structure, and each of the fields including a title field corresponding to a title, a basic field corresponding to a data entry item, and a group field designating one or more of the fields to be treated as a single field;
    document input means for inputting and for updating the document data;
    document data storage means for storing said document data in a document file; and
    document data preparing means for arranging said stored document data into said tree structure in accordance with said stored document format-data, and for storing the arranged document data into said document data storage means.

2. A system for editing document data according to claim 1, wherein the internal tree structure of said stored document format-data comprises a plurality of document data records which are stored in a table, which correspond to the fields of the document data, and which have tree-structure levels.

3. A system for editing document data according to claim 2, wherein each of said document data records has a first item used to set a first code specifying the type of the field corresponding to the document data record, a second item used to set an ID code specifying a data format record corresponding to the document data record, a third item used to set the number of lines to be displayed or printed in the field, a fourth item used to set the number of digits per line, a fifth item used to set a flag representing the nature of the field, and a sixth item used to set the number of a screen control record corresponding to the document data record.

4. A system for editing document data according to claim 3, wherein said flag comprises at least one of the following flags:
    (a) a copy flag for indicating that the field can be copied in the document data;
    (b) a position flag for specifying the fields subordinate to a larger field and for designating the expansion or contraction of the subordinate fields in a horizontal direction and in a vertical direction before these fields are displayed or printed;
    (c) a division flag for indicating whether the entire data to be printed in the field should be printed on the next page, or whether only the over-flowing portion of the data should be printed on the next page; and
    (d) a title-printing flag for indicating whether or not a title should be printed in the corresponding title field.

5. A system for editing document data according to claim 1, wherein the internal tree structure of said stored document format-data comprises a plurality of logic pointers which define the relationship of document data records which correspond to the fields of the document data.

6. A system for editing document data according to claim 5, wherein each of said document data records has a first item used to set a first code specifying the type of the field corresponding to the document data record, a second item used to set an ID code specifying a data format record corresponding to the document data record, a third item used to set the number of lines to be displayed or printed in the field, a fourth item used to set the number of digits per line, a fifth item used to set a flag representing the nature of the field, a sixth item used to set the number of a screen control record corresponding to the document data record, and a seventh item used to set a respective one of said logic pointers representing the relationship between the field and the document data record.

7. A system for editing document data according to claim 6, wherein said flag comprises at least one of the following flags:
    (a) a copy flag for indicating that the field can be copied in the document data;
    (b) a position flag for specifying the fields subordinate to a larger field and for designating the expansion or contraction of the subordinate fields in a horizontal direction and in a vertical direction before these fields are displayed or printed;
    (c) a division flag for indicating whether the entire data to be printed in the field should be printed on the next page, or whether only the over-flowing portion of the data should be printed on the next page; and
    (d) a title-printing flag for indicating whether or not a title should be printed in the corresponding title field.

8. A system for editing document data according to claim 1, further comprising:
    document display means for displaying the document data;
    screen display format data storage means for storing screen display format data arranged into said tree structure in order to display on said document display means the document data organized into said tree structure; and
    screen display means, coupled to said document data storage means, said screen display format data storage means, and said document display means, for displaying, in a hierarchical structure, the document data arranged in a hierarchical structure in accordance with the screen display format data stored in said screen display format data storage means.

9. A system for editing document data according to claim 8, wherein one record of said screen display format data corresponds to one record of the document data, and said screen display format data record has a first item used to set a first code specifying the type of the field corresponding to the display format data record, a second item used to set an ID code specifying one of the fields of the document data which corresponds to the screen display format data record, a third item used to set the level of said field corresponding to the screen display format data record, a fourth item used to set the number of lines to be displayed and printed in said corresponding field, a fifth item used to set the number of digits per line, a sixth item used to set a flag representing the nature of said corresponding field, a seventh item used to set the display-starting position of said corresponding field, and an eighth item used to set a field pointer specifying the one of the fields of said document file which corresponds to the screen display format data record.

10. A document-editing system according to claim 9, wherein said first code, said ID code, said level of a field, said number of digits per line, and said flag, which all are set in the items of the screen control data record, are copied from the data which are set in the items of the document-data record corresponding to the screen display format data record; and when said first code specifies a title field, the number of lines set in said fourth item is copied from the number of lines set in the format-data record corresponding to the screen control data record, when said first code specifies a basic field, the number of lines is determined by the amount of data set in that item of the corresponding document-data record which is used to set a pointer, and when said first code specifies a group field, the number of lines is determined by the total number lines of the fields subordinate to the group field.

11. A system for editing document data according to claim 1, wherein a document format-data record defining said document format data has a first item used to set a first code specifying the type of field corresponding to the document data record, a second item used to set an ID code specifying one of the fields of the document data which corresponds to the document format-data record, a third item used to set the level of the specified field, a fourth item used to set the number of lines to be initially displayed or printed in the corresponding one of the fields, a fifth item used to set the number of digits per line, a sixth item used to set a flag representing the nature of the specified field, and a seventh item used to draw field-framing lines defining the specified field.

12. A system for editing document data according to claim 11, wherein said document format-data record includes an eighth item for designating a line of characters to be displayed and printed as title data, when the code set in said first item specifies a title field.

13. A system for editing document data according to claim 11, further comprising document management means for controlling the operation of said document-preparing format-data storage means and said document data storage means, and wherein, when said first code specifies a title field, a basic field, or a group field, said document-data management means produces, within the document-data storage means, the document-data record corresponding to the document format-data record, transfers said first code, said ID code, said level of said specified field, said number of lines, said number of digits per line, and said flag—all of which are set in the items of the format-data record—to the corresponding items of the document-data record input to said document-data management means, and constructs document data of a tree structure of the level specified by said flag set in the format-data record; and when said first code specifying the type of the document-data record specified initial data, said document-data management means writes said initial data in said document file, and sets a pointer indicating the storage location of said initial data, in an item of the document-data record which is stored in the document-data storage means and corresponds to the basic field immediately preceding the document-data record corresponding to the format-data record input to the document-data management means.

14. A system for editing document data according to claim 1, wherein a document format-data record defining said document format data has a first item used to set a first code specifying the field corresponding to the format data record, a second item used to set an ID code specifying the one of the fields of the document data which corresponds to the format data record, and a third item used only when the first code set specifies initial data and is used to specify data to be input to the corresponding field as an initial value.

15. The system for editing document data according to claim 1, wherein the system further comprises means for determining the number of lines and the number of digits of the group field including any of said fields being treated as a single field, and said number of lines and said number of digits are increased and decreased in response to the document data input by said document input means.

16. A system for editing document data according to claim 1, further comprising:
- print format data storage means for storing print format data organized in said tree structure;
- document data print means, responsive to said print format data storage means, for printing document data arranged in said tree structure; and
- print means, coupled to said document data storage means, said print format data storage means, and said document data print means, for printing, in said tree structure, the document data arranged in said tree structure in accordance with the print format data stored in the print format data storage means.

* * * * *